United States Patent [19]
Stoltman

[11] 3,799,303
[45] Mar. 26, 1974

[54] BRAKE SYSTEM CONTROLLED CHOKE VALVE

[75] Inventor: Donald D. Stoltman, Henrietta, N.Y.

[73] Assignee: General Motors Corporation, Detroit, Mich.

[22] Filed: Dec. 11, 1972

[21] Appl. No.: 313,850

[52] U.S. Cl............ 192/3 M, 123/97 B, 123/119 F
[51] Int. Cl............................................ B60k 29/02
[58] Field of Search ......... 192/3 R, 3 M; 123/97 B, 123/119 F

[56] References Cited
UNITED STATES PATENTS
3,568,808   3/1971   Hampton ........................ 192/3 R
2,630,871   3/1953   Simpkins ......................... 192/3 M
2,183,354   12/1939  Lange ............................ 192/3 M X Primary Examiner—Benjamin W. Wyche
Assistant Examiner—Lance W. Chandler
Attorney, Agent, or Firm—Arthur N. Krein

[57]   ABSTRACT

A throttle override system for a conventional throttle controlled internal combustion engine in a vehicle wherein the choke valve in the engine air induction passage is also controlled by a spring and vacuum motor mechanism to partly close the choke valve to control the flow of air to the engine when the vehicle operator actuates the vehicle brake system with a predetermined force.

3 Claims, 1 Drawing Figure

PATENTED MAR 26 1974 3,799,303
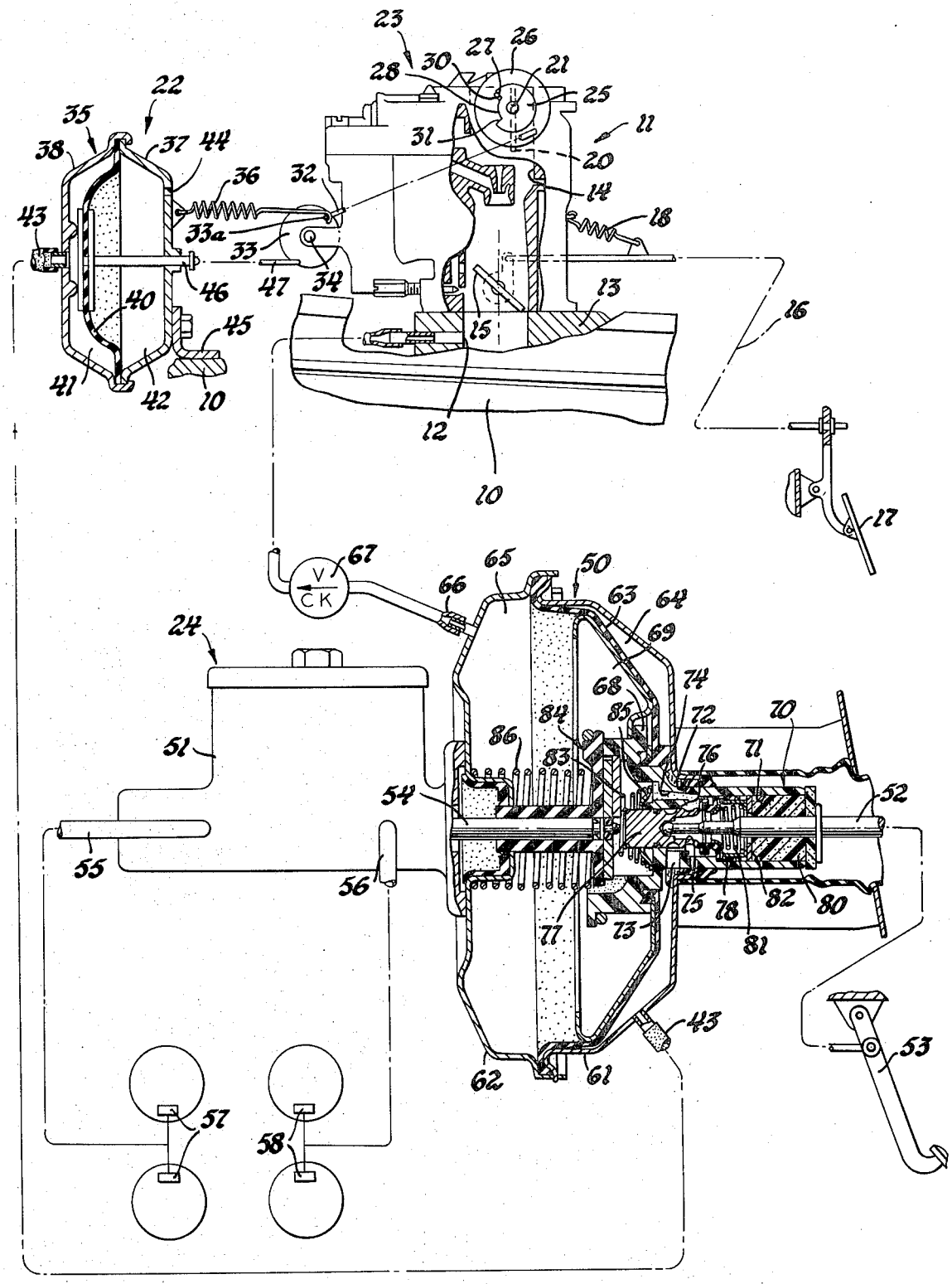

BRAKE SYSTEM CONTROLLED CHOKE VALVE

The present invention relates to a throttle control for an internal combustion engine and more particularly to a throttle override system for a vehicle to control the flow of air to the engine as a function of brake actuation.

During normal vehicle operation, it is customary to decelerate the engine before effecting vehicle braking but, under certain circumstances, this is not always possible. There may therefore be times when the throttle valve may not be returned to an idle or low idle position before vehicle braking is required and, under these conditions, the engine will still be operating to power the vehicle forward at the same time the operator is attempting to brake the vehicle to a stop. This latter condition will frequently occur, for example, with drivers who use their left foot for braking since their right foot may still be on the accelerator pedal holding the throttle valve open as they attempt to brake with their left foot.

It is therefore a primary object of the present invention to provide a throttle override system for the internal combustion engine of a vehicle which is operable on vehicle braking to control the choke valve of the engine carburetor to thereby reduce the airflow to the engine in lieu of this airflow being controlled by the throttle of the carburetor.

It is another object of the present invention to provide an airflow control system for the internal combustion engine of a vehicle wherein the choke valve in the air induction passage to the engine is operatively connected to a spring and vacuum motor actuator, the operation of the latter being controlled by the vacuum boosted power braking system of the vehicle.

These and other objects of the invention are attained in a vehicle by a throttle override system which includes a choke actuator mechanism operatively connected to the choke valve of the engine carburetor in a manner to permit the choke valve to be operated normally in a conventional manner except when the brake system of the vehicle is actuated with an applied force above a predetermined value. The choke actuator mechanism includes a spring to normally bias the choke valve to a partly closed position and a vacuum motor connected to a source of vacuum, such as the intake manifold of the engine, through the vacuum booster unit of the vehicle power brake system whereby, when the brake system is not actuated above a predetermined force, the biasing action of the spring is overpowered by the vacuum motor to permit normal functioning of the choke valve. When the brake system is actuated by an applied predetermined force, the vacuum motor is placed in communication with the atmosphere so that the spring will effect movement of the choke valve to the partly closed position to limit flow of air to the engine independent of the position of the carburetor throttle valve at that time.

For a better understanding of the invention, as well as other objects and further features thereof, reference is made to the following description taken in conjunction with the single accompanying drawing which is a schematic of a vehicle engine and brake system and including a throttle override system in accordance with the invention, with some of the elements of these systems being illustrated in cross section.

With reference to the drawing, there is shown the internal combustion engine 10 of a vehicle, not shown, having a carburetor 11 mounted thereon to supply an air-fuel mixture to the induction passage 12 in the intake manifold 13 of the engine. Flow through the intake bore 14 of the carburetor is primarily operator-controlled by a throttle valve 15 actuated through a throttle linkage 16 and accelerator pedal 17 to effect opening of the throttle valve 15, a spring 18 being used to normally bias the throttle valve to a closed position. As is conventional, a choke valve 20 is fixed to a choke shaft 21 for pivotal movement in the intake bore 14 of the carburetor upstream of throttle valve 15 and is operable in a conventional manner.

Now in accordance with the invention, a power actuator 22 is connected through a lost motion device 23 to the choke valve 20 to effect closure of the choke valve 20 to a predetermined partly closed position upon application of at least a predetermined force to actuate the braking system 24 of the vehicle in a manner to be described whereby flow of air to the engine 10 is controlled by the choke valve 20 in lieu of the throttle valve. The lost motion device 23, in a manner to be described, permits normal operation of the choke valve 20, except when the brakes are actuated with at least the above described predetermined force, whereby airflow to the engine is controlled by the position of the throttle valve in a normal manner.

In the embodiment shown, the lost motion device is mounted on the choke shaft 21 and includes a fixed lever 25 fixed to the end of the choke shaft for rotation therewith and a loose lever 26 loosely fixed to the choke shaft 21 inboard of fixed lever 25 for pivotal movement relative to this shaft. Loose lever 26 is provided with an axial extending tab 27 positioned to be received in the arcuate slot 28 of fixed lever 25, the length of the slot 28 being defined at opposite ends by shoulders 30 and 31. The spacing between shoulders 30 and 31 of fixed lever 25 is such that with fixed lever 25 in the position shown, the choke valve 20 can be moved in a conventional manner between a closed position and an open position. However, when the loose lever 26 is rotated in a clockwise direction with reference to the drawing from its position as shown, the tab 27 thereon will engage the shoulder 30 of fixed lever 25 to effect corresponding clockwise rotation of fixed lever 25, moving the choke valve 20 toward a predetermined partly closed position which is between the normal closed and open positions of the choke valve, this partly closed position of the choke valve being selected, as desired, to provide for adequate airflow to the engine to effect its operation at a reduced speed as desired or to permit engine starting. Rotational positioning of the loose lever 26 is effected by means of the power actuator 22.

Although the power actuator 22 could be directly coupled to the loose lever 26 to effect the rotational positioning of this lever, because of space limitations, the actuator mechanism 22, in the embodiment disclosed, is connected to the loose lever 26 through a motion conversion mechanism which includes a transfer rod 32 pivotally connected at one end to the loose lever 26 and at its other end pivotally connected to the disc 33 journalled on the spindle 34 suitably supported by carburetor 11 to rotate about an axis parallel to the axis of rotation of choke shaft 21. This coupling arrangement is such that clockwise rotation of disc 33 effects counterclockwise pivotal rotation of loose lever 26 while counterclockwise rotation of disc 33 effects clockwise rotation of loose lever 26, with reference to the drawing.

The power actuator 22 includes a differential fluid pressure actuated motor in the form of a vacuum motor 35 and a spring 36, the spring 36 being shown as a separate element mounted externally of the vacuum motor 35 although, it is to be realized that this spring could form part of the vacuum motor assembly in a known manner.

Vacuum motor 35 comprises a housing forced by cup-shaped right and left housing parts 37 and 38, respectively, that securely seal a diaphragm 40 therebetween to define a vacuum chamber 41, the left-hand chamber with reference to the drawing, and an atmospheric chamber 42, the right-hand chamber, the vacuum chamber 41 being connected by a conduit 43 to communicate with the variable pressure chamber of the vacuum booster unit and the atmospheric chamber 42 being in direct flow relationship to the atmosphere through an aperture 44 in the right housing part 37. Vacuum motor 35 is mounted by bracket 45 to engine 10 in a spaced apart relationship to carburetor 11 so that its actuator rod 46, one end of which is centrally affixed to diaphragm 40, extends slidably through right housing part 37 in a line substantially tangentially towards the disc 33, the other end of actuator rod 46 being connected by a cable 47 to the disc 33.

Spring 36 is connected at one end to the housing part 37 and at its other end is connected to the axial extending pin 33a positioned radially outward and diametrically opposite the cable 47 connection to disc 33.

When the pressure on the opposite sides of vacuum motor diaphragm 40 is sufficiently decreased in the manner to be described, spring 36 effects rotation of disc 33 in the counterclockwise direction, thereby effecting a substantially translational movement of transfer rod 32 to in turn effect a rotational movement of loose lever 26 in the choke valve closing direction, the amount of rotation of loose lever 26 corresponding generally with that of disc 33. As loose lever 26 is thus rotated in the choke valve closing direction, tab 27 first engages shoulder 30 of fixed lever 25 and then forces fixed lever 25 to follow the movement of loose lever 26, fixed lever 25 in turn forcing choke shaft 21 and therethrough choke valve 20 in the closing direction against any air loads or automatic choke loads tending to keep choke valve 20 open. The amount of closing rotation effected through the rotation of loose lever 26 is limited to the translation of transfer rod 32 as effected by rotation of disc 33 and the amount of such translation is selected so that, rather than being returned to its closed position, choke valve 20 is returned to the partly closed position offset slightly in the choke valve opening direction from the closed position, as previously described. When in the partly closed position, choke valve 20 reduces the airflow to the engine to effect deceleration of the engine regardless of the position of the throttle valve at the time, the air-fuel mixture then provided to engine 10 being sufficiently enriched so as to greatly reduce the power output of engine 10 without stalling the engine. In addition, in the event that upon engine starting the spring 36 is effective to move the choke valve to the partly closed position, the choke valve opening is sufficient to permit engine start-up in a normal manner.

Operation of the vacuum motor 35 is controlled by operation of the vehicle braking system 24 whereby during normal vehicle operation with the vehicle braking system in its released position, vacuum motor 35 is vacuum actuated to hold loose lever 26 in a position so that the operator has control of the engine operation in a conventional manner by actuation of the throttle valve 15. However, when the operator actuates the vehicle braking system 24 with a predetermined applied brake pedal pressure, the pressure in vacuum chamber 41 approaches atmospheric pressure allowing spring 36 to effect movement of loose lever 26 to partially close choke valve 20 to thus limit airflow to the engine so that it can only operate at a predetermined idling speed thus overriding control of engine operation by throttle valve 15.

As shown in the drawing, this is accomplished by a conventional vehicle braking system 24 of the type having a power brake unit of the combined vacuum and hydraulic unit type which utilizes engine intake manifold vacuum and atmospheric pressure to provide power assisted application of the vehicle brakes. This type of power brake unit is composed of two main sections, a vacuum power cylinder or booster 50 and a hydraulic master cylinder assembly 51.

Vacuum booster 50 may be either of the conventional double diaphragm type or, as shown, a conventional single diaphragm type, such as disclosed in the U.S. Pat. No. 3,249,021, issued May 3, 1966, to Clarence R. Wuellner, and entitled "Power Brake Booster." With reference to the drawing, vacuum booster 50 has a push rod 52 pivotally connected to the vehicle brake pedal 53 and has a piston rod 54 extending into the hydraulic master cylinder assembly 51 which is connected by front and rear brake lines 55 and 56, respectively, to the front and rear brakes 57 and 58, respectively, to pump hydraulic pressure fluid thereto upon actuation of the vehicle brake pedal 53.

Vacuum booster 50 comprises a housing formed by generally cup-shaped right and left housing parts 61 and 62, respectively, separated by a centrally apertured diaphragm 63 into the right chamber 64 and the left chamber 65 with reference to the drawing. Right chamber 64 is selectively connected, as to be hereinbelow described, to either left chamber 65 or to the atmosphere and is hereinafter called the variable pressure chamber 64. The left chamber 65 is connected by a conduit 66 with a one-way check valve 67 therein to communicate with the engine vacuum provided at induction passage 12 and is hereinafter called the vacuum chamber 65. The outer periphery of diaphragm 63 is sealingly connected between the right and left housing parts 61 and 62 and the inner periphery of diaphragm 63 is sealingly connected to the radial flange 68 of a tubular-shaped power piston 70 having a centrally located stepped bore 71 therethrough, one end of power piston 70 being of a reduced diameter to be reciprocally received in a central aperture 72 of right housing part 61. A dish-shaped support plate 69 is connected to the power piston flange 68 on the left side of diaphragm 63 for movement therewith. The diaphragm 63, support plate 69 and power piston 70 form a power piston assembly that is movable as a unit within the vacuum booster housing.

Power piston 70 is also provided with one or more radial passages 73 extending through the tubular wall thereof and with one or more axial passages 74, only one radial passage 73 being shown located 90° from its actual position and only one axial passage 74 being shown. Each radial passage 73 communicates with an axial slot 75 in stepped bore 71 and the variable pressure chamber 64. Each axial passage 74 communicates at one end with the portion of stepped bore 71 outboard of an annular shoulder 76 located between the enlarged and reduced diameter portions of stepped bore 71 and at its other end with the vacuum chamber 65 through the enlarged left-hand bore end of power piston 70.

Reciprocably received in the reduced diameter portion of stepped bore 71 is an air valve seat member 77 that cooperates with an annular centrally apertured floating air valve 78 to provide an air valve for selectively connecting variable pressure chamber 64 to communicate with the atmosphere or with the vacuum chamber 65.

As described in greater detail in the hereinabove referenced U.S. Pat. No. 3,249,021 to Wuellner, floating air valve 78 is positioned concentrically about push rod 52 and provides thereabout a central passage, the right end of which communicates with the atmosphere through an annular filter 80 in the hub of the power piston and the left end of which is normally seated against the right end of air valve seat member 77. The right end of floating air valve 78 is sealingly retained in the enlarged diameter portion of stepped bore 71 and the left end of floating air valve 78 is biased leftwardly by a floating air valve spring 81 from a spring retainer 82 to normally seat on the right end of air valve member 77, thereby normally blocking communication between the variable pressure chamber 64 and the atmosphere.

An air valve spring 83 is positioned between the right end of the reaction assembly 84, which includes the piston rod 54, carried in the enlarged diameter portion of power piston 70 and a spring retainer cup 85 suitably secured to the left end of air valve seat member 77 to normally bias the air valve seat member 77, to the right as seen in the drawing, into seating relationship with the floating air valve 78. A power piston return spring 86 encircles the piston rod 54 within the vacuum chamber 65 to normally bias the power piston to the right to the position shown in the drawing wherein the power piston 70 engages against the housing part 61. This is the position of the above-identified elements with the brake system 24 in its released position, that is, with no braking pedal pressure being applied to brake pedal 53.

In the released position of the brake system, as shown in the drawing, the air valve seat member 77 is seated against floating air valve 78. The flow of air under atmospheric pressure, which enters through the filter 80 is blocked at the air valve seat member 77 which is seated against the floating air valve 78. In this position, the floating air valve 78 is held away from the valve seat formed by annular shoulder 76 in the power piston 70. Vacuum which is present at all times in vacuum chamber 65 is free to evacuate the variable pressure chamber 64 with flow therefrom being through radial passage 73, axial slot 75, the passage between shoulder 76 of the power piston and the floating air valve 78 and then through the axial passage 74 in the power piston. At the same time, vacuum in the variable pressure chamber 64 is applied through conduit 43 to the vacuum chamber 41 of vacuum motor 35. With vacuum pressure now present on one side of the diaphragm 40 of this motor and atmospheric pressure on the other side, the vacuum motor 35 through cable 47 and disc 33 retracts transfer rod 32 to hold loose lever 26 in a position allowing normal operation of choke valve 20, the position of loose lever shown in the drawing. Thus, whenever the brake system is returned to or is in a released position, choke valve 20 will be permitted to move normally between its opened position and its closed position.

When the vehicle operator applies the brakes by actuation of the brake pedal 53, the push rod 52 is moved to the left with reference to the drawing to carry with it the air valve seat member 77. With such leftward movement of air valve seat member 77, the floating air valve 78 is biased leftwardly by floating air valve spring 81 to follow the air valve seat member 77 until the floating air valve 78 seats on shoulder 76 to block communication between the variable pressure chamber 64 and the vacuum chamber 65 by closing off flow through axial passages 74. After the floating air valve 78 is stopped by shoulder 76 from following leftward movement of air valve seat member 77, the air valve seat member 77 is unseated from the floating air valve 78 to provide a passage therebetween that connects the variable pressure chamber 64 to communicate with the atmosphere through radial passages 73, axial slots 75, the central aperture in floating air valve 78, the enlarged diameter portion of stepped bore 71, and air filter 80. Since vacuum chamber 65 is connected to communicate with engine vacuum provided in induction passage 12 of engine 10, this allows a leftwardly acting pressure differential to be created on the opposite sides of diaphragm 63 with the pressure in the variable pressure chamber 64 approaching atmospheric pressure upon the application of a predetermined force applied to brake pedal 53. This pressure differential causes diaphragm 63, power piston 70 and support plate 69 to move to the left from the position shown in the drawing, thereby effecting a corresponding leftward movement of reaction assembly 84 and its piston rod 54 to effect vehicle braking.

When a desired pedal pressure is reached, the power piston 70 has moved to the left sufficiently until the floating air valve 78, which is still seated against shoulder 76, again seats on the air valve seat member 77. Seating of the floating air valve on the air valve seat member shuts off the flow of air at atmospheric pressure and seals the reduced vacuum level in the variable pressure chamber which provides the power assist as this pressure acts against the diaphragm and power piston. The elements of the power brake unit are not in the holding position and will then remain in this relationship to each other until either pressure is applied or released at the brake pedal 53.

As the pressure in variable pressure chamber 64 increases to atmospheric pressure which will occur when the brake pedal is actuated with at least a predetermined force, this air under pressure will flow from this chamber through conduit 43 to vacuum chamber 41 of vacuum motor 35 thereby allowing spring 36 to effect movement of choke valve 20 to a partly closed position in the manner hereinabove described. As long as the brake pedal pressure, above a predetermined value, is applied, spring 36 will hold the choke valve 20 in the partially closed position in the manner described.

Upon removal of actuating force from vehicle brake pedal 53, power piston 70 and air valve seat member 77 are returned rightwardly to their nonactuated or released positions, as previously described, by the power piston return spring 86 and air valve spring 83, respectively, thereby re-establishing the normal communication between the variable pressure chamber 64 and the vacuum chamber 65 while blocking communication between the variable pressure chamber 64 and the atmosphere so that vacuum is again applied in variable pressure chamber 64. As this occurs, vacuum is again applied to the vacuum chamber 41 of the vacuum motor 35 causing disc 33 and transfer rod 32 to effect rotation of loose lever 26 back to its normal position wherein tab 27 does not contact shoulder 30 so that engine operation is then controlled by throttle valve 15 and normal operation of the choke valve is permitted.

Having described one embodiment of the present invention, it is understood that the specific terms and examples are employed in a descriptive sense only and not for the purpose of limitation. Other embodiments of the invention, modifications thereof and alternatives thereto may be used. I therefore aim in the appended claims to cover such modifications and changes as are within the true spirit and scope of my invention.

What I claim as new and desire to secure by letters Patent of the United States is:

1. In a vehicle including an internal combustion engine providing a source of engine vacuum and having an air induction passage, an operator-controlled throttle valve pivotably mounted in the air induction passage to normally regulate airflow to the engine, a choke valve pivotably mounted on a choke shaft upstream of the throttle valve in the air induction passage; and a vacuum boosted power braking system including a brake pedal, hydraulic pump means hydraulically connected to the set of vehicle wheel brakes, and a vacuum booster unit connected to the hydraulic pump means, the vacuum booster unit having a first pressure chamber, a second pressure chamber, and air valve means actuatable on actuation of the brake pedal, the first pressure chamber being connected to the source of engine vacuum and the second pressure chamber being selectively connectable by the air valve means to the first pressure chamber when the brake pedal is not actuated and to the atmosphere when the brake pedal is actuated;
   a. differential fluid pressure actuated power means including a housing and a diaphragm means, said diaphragm means separating said housing into a first chamber and a second chamber, said first chamber being operatively connected to communicate with the second pressure chamber of the vacuum booster unit and said second chamber being connected to communicate with the atmosphere;
   b. lost motion linkage means operatively connecting said diaphragm means of said differential fluid pressure actuated power means and said choke shaft and including a first lever fixed to one end of said choke shaft and a second lever loosely carried by said shaft at said one end and rotatable relative thereto between a first position and a second position, said first lever having an arcuate slot therein and said second lever having a tab slidably received in said slot and operative to engage said first lever at one end of said slot whereby, with said brake pedal not actuated, said diaphragm means positions said second lever in said first position and said slot permits said first lever to move relative to said second lever as said first lever follows the movement of the choke valve between a fully open position and a closed position; and
   c. spring means operatively connected to said lost motion linkage means and operative when said brake pedal is actuated to effect movement of said second lever from said first position to said second position as said first chamber of said differential fluid pressure actuated power means is placed in communication with the atmosphere whereby said tab of said second lever engages said first lever at one end of said arcuate slot to cause said first lever to effect movement of said choke valve through said choke shaft to a partially closed position offset slightly in the choke valve opening direction from the closed position.

2. In a vehicle including an internal combustion engine providing a source of engine vacuum and having an air induction passage, an operator-controlled throttle valve pivotably mounted in the air induction passage to normally require airflow to the engine, choke valve means including a choke valve pivotably mounted on a choke shaft upstream of the throttle valve in the air induction passage; and a vacuum boosted power braking system including a brake pedal, hydraulic pump means hydraulically connected to a set of vehicle wheel brakes, and a vacuum booster unit connected to the hydraulic pump means, the vacuum booster unit having a first pressure chamber, a second pressure chamber, and air valve means actuatable on actuation of the brake pedal, the first pressure chamber being connected to the source of engine vacuum and the second pressure chamber being selectively connectable by the air valve means to the first pressure chamber when the brake pedal is not actuated and to the atmosphere when the brake pedal is actuated;
   a. differential fluid pressure actuated power means including diaphragm means and at least one chamber formed by said diaphragm means;
   b. conduit means connecting said one chamber of said differential fluid pressure actuated power means and the second pressure chamber of the vacuum booster unit;
   c. lost motion linkage means operatively connecting said diaphragm means of said differential fluid pressure actuated power means to the choke shaft and operative to permit the choke valve to be normally moved between a full open position and a closed position when said first chamber of said differential fluid pressure actuated power means is placed in communication with said source of engine vacuum; and,
   d. spring means operatively connected to said lost motion means and operative to return the choke valve to a partially closed position intermediate the fully open position and the closed position when said one chamber of said differential fluid pressure actuated power means is placed in communication with the atmosphere.

3. In the vehicle according to claim 2, wherein said lost motion means comprises a first lever and a second lever, said first lever being fixed to the choke shaft to rotate therewith and said second lever being loosely carried by the choke shaft, said second lever having an axial extending tab thereon positioned thereon, said first lever having a slot receiving said tab of a length to permit limited rotation of said first lever relative to said second lever.

\* \* \* \* \*

PO-1050
(5/69)

UNITED STATES PATENT OFFICE
CERTIFICATE OF CORRECTION

Patent No. 3,799,303    Dated March 26, 1974

Inventor(s) Donald D. Stoltman

It is certified that error appears in the above-identified patent and that said Letters Patent are hereby corrected as shown below:

Column 3, line 12, "forced" should be --formed--,

Column 5, line 32, after "valve" insert --seat--,

Column 8, line 23, "require" should be --regulate--.

Signed and sealed this 26th day of November 1974.

(SEAL)
Attest:

McCOY M. GIBSON JR.
Attesting Officer

C. MARSHALL DANN
Commissioner of Patents